(12) United States Patent
Clinton et al.

(10) Patent No.: US 8,819,668 B2
(45) Date of Patent: Aug. 26, 2014

(54) ACCESSIBLE LIMITED DISTRIBUTION RELEASE SOFTWARE CHANGE CATALOG

(75) Inventors: Nate Clinton, Sammamish, WA (US);
Karuna Koneru, Redmond, WA (US);
Michael Meulemans, Renton, WA (US);
Anand Vaidyanathan, Kirkland, WA (US); Dandan He, Redmond, WA (US);
Phil Cupp, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1387 days.

(21) Appl. No.: 11/672,940

(22) Filed: Feb. 8, 2007

(65) Prior Publication Data
US 2008/0196021 A1    Aug. 14, 2008

(51) Int. Cl.
*G06F 9/44* (2006.01)
*G06F 9/445* (2006.01)

(52) U.S. Cl.
USPC .......................................... 717/172; 717/177

(58) Field of Classification Search
None
See application file for complete search history.

(56) References Cited

U.S. PATENT DOCUMENTS

| | | | |
|---|---|---|---|
| 5,835,777 | A | 11/1998 | Staelin |
| 5,999,740 | A | 12/1999 | Rowley |
| 6,049,671 | A | 4/2000 | Slivka et al. |
| 6,145,096 | A | 11/2000 | Bereiter et al. |
| 6,282,711 | B1 | 8/2001 | Halpern et al. |
| 6,477,703 | B1 | 11/2002 | Smith et al. |
| 6,493,871 | B1 | 12/2002 | McGuire et al. |
| 6,496,974 | B1 | 12/2002 | Sliger et al. |
| 6,542,898 | B1 | 4/2003 | Sullivan et al. |
| 6,742,141 | B1 | 5/2004 | Miller |
| 6,772,192 | B1 | 8/2004 | Fulton et al. |
| 6,996,815 | B2 | 2/2006 | Bourke-Dunphy et al. |
| 6,999,990 | B1 | 2/2006 | Sullivan et al. |

(Continued)

FOREIGN PATENT DOCUMENTS

| | | |
|---|---|---|
| CA | 2 299 850 A1 | 9/2001 |
| WO | 00/77614 A2 | 12/2000 |
| WO | 2005116888 A2 | 12/2005 |

OTHER PUBLICATIONS

Altinkemer, K. et al., Vulnerabilities and Patches of Open Source Software: An Empirical Study, http://www.mgmt.purdue.edu/academics/mis/workshop/ars_092305.pdf, Krannert Graduate School of Management and The Center for Education and Research in Information Assurance and Security (CERIAS), Purdue University, 38 pages, Indiana, United States.

(Continued)

*Primary Examiner* — Insun Kang
*Assistant Examiner* — Todd Aguilera
(74) *Attorney, Agent, or Firm* — Jim Sfekas; Kate Drakos; Micky Minhas (57) ABSTRACT

A catalog for maintaining a store of public and private limited distribution release software changes in a single location. A method for distributing limited distribution release software changes to clients via a network comprises receiving a search request, authenticating the client, querying a database of limited distribution release software changes, filtering the returned data according to a screening criteria, and providing the returned data to the client. A further method receives a request from a client to develop a limited distribution release software change, develops the limited distribution release software change, adds the developed limited distribution release software change to a catalog, notifies the client, and provides an interface to the client for accessing. A system further links knowledge base entries with related limited distribution release software changes.

10 Claims, 5 Drawing Sheets

(56) References Cited

U.S. PATENT DOCUMENTS

| | | | |
|---|---|---|---|
| 7,020,875 B2 * | 3/2006 | Zweifel et al. | 717/168 |
| 7,055,149 B2 | 5/2006 | Birkholz et al. | |
| 7,149,789 B2 | 12/2006 | Slivka et al. | |
| 7,188,342 B2 | 3/2007 | DeMello et al. | |
| 7,203,940 B2 * | 4/2007 | Barmettler et al. | 717/178 |
| 7,231,637 B1 * | 6/2007 | McEwan | 717/171 |
| 7,451,440 B2 * | 11/2008 | Zweifel | 717/168 |
| 7,512,941 B2 | 3/2009 | Pan et al. | |
| 7,555,749 B2 | 6/2009 | Wickham et al. | |
| 7,743,373 B2 | 6/2010 | Avram et al. | |
| 7,748,000 B2 | 6/2010 | Genty et al. | |
| 7,765,538 B2 * | 7/2010 | Zweifel et al. | 717/168 |
| 7,979,856 B2 | 7/2011 | Murray et al. | |
| 8,196,134 B2 * | 6/2012 | Clinton et al. | 717/173 |
| 2001/0029605 A1 | 10/2001 | Forbes et al. | |
| 2003/0033313 A1 * | 2/2003 | Zweifel et al. | 707/100 |
| 2003/0079216 A1 | 4/2003 | Drane et al. | |
| 2004/0117783 A1 | 6/2004 | Kaminsky et al. | |
| 2004/0236843 A1 | 11/2004 | Wing et al. | |
| 2005/0063242 A1 | 3/2005 | Ren | |
| 2005/0144616 A1 * | 6/2005 | Hammond et al. | 717/173 |
| 2005/0188259 A1 * | 8/2005 | Zweifel | 714/23 |
| 2005/0257214 A1 | 11/2005 | Moshir et al. | |
| 2006/0080257 A1 * | 4/2006 | Vaughan et al. | 705/51 |
| 2006/0101457 A1 * | 5/2006 | Zweifel et al. | 717/174 |
| 2006/0109977 A1 | 5/2006 | Grannan et al. | |
| 2006/0287957 A1 * | 12/2006 | Pieper et al. | 705/51 |
| 2007/0038991 A1 * | 2/2007 | Schuft et al. | 717/172 |
| 2007/0094658 A1 * | 4/2007 | DiCarlo et al. | 717/178 |
| 2007/0245358 A1 * | 10/2007 | Hattori et al. | 719/321 |
| 2008/0134165 A1 | 6/2008 | Anderson et al. | |

OTHER PUBLICATIONS

Arora, et al., An Empirical Analysis of Software Vendors' Patching Behavior: Impact of Vulnerability Disclosure, http://www.heinz.cmu.edu/~rtelang/disclosure_jan_06.pdf, H. John Heinz III School of Public Policy and Management, Carnegie Mellon University, Jan. 2006, 33 pages, Pittsburgh, PA, United States.

Colarik, et al., Update/Patch Management Systems: A protocol taxonomy with security implications, http://www.cs.auckland.ac.nz/~cthombor/Pubs/SEC2004FIN.pdf, The University of Auckland, 14 pages, New Zealand.

Bennett et al., "Safe Mechanism for Installing Operating System Updates with Applications," IBM Technical Disclosure Bulletin, vol. 41, No. 1, Jan. 1998, 6 pgs.

Hans-Christoph Steiner, Towards a Catalog and Software Library of Mapping Methods,Jun. 2006, 4 pages, http://deliverey.acm.org/10.1145/1150000/1142241/p106-steiner.pdf.

Zimmermann et al., Mining Version Histories to Guide Software Changes, May 2004, 10 pages, http://delivery.scm.org/10.1145/1000000/999460/21630563.pdf.

* cited by examiner

ACCESSIBLE LIMITED DISTRIBUTION RELEASE SOFTWARE CHANGE CATALOG

BACKGROUND

Software applications often require updating to ensure their proper functioning. Such updates can be periodic, or in response to a particular event, such as a security threat. Conventionally, some software update releases (e.g., patches, security updates, drivers, feature packs, update rollups, and service packs, among others) are globally distributed, affecting many users of a particular software. Also conventionally, these software updates are automatically loaded and installed upon computing devices, often without user intervention.

In contrast, other types of software updates are released to much smaller audiences. For example, some of these software updates are private in nature and are only applicable to a small class of clients and computing devices. Such limited distribution release software updates are often produced and distributed at the request of a sole client, rather than driven by general preferences and requests of many clients. One type of limited distribution release software change is conventionally referred to as a hotfix, although any type of specific, non-globally distributed, software update is contemplated as within the scope of the present application.

Hotfixes are designed and implemented for a specific client based upon a request for such a software solution. In this manner, they are specific, discrete entities that may only have applicability to the requesting client. Over time, however, such hotfixes can become more generally available, such as after they have been made available to one or more clients for a time, they can be distributed to a larger audience of other similarly situated clients. Conventionally, a client calls its technical account manager and requests a specific fix for a particular problem. This technical account manager will then seek a solution to the problem from a product development group. The product development group will then provide a private, pretested solution to the client's problem. The product development group then gives the private solution to the technical account manager who typically posts the solution to an ftp (file transfer protocol) site, or other file transfer means. The technical account manager then informs, either personally or via electronic messaging, the client that the solution is ready. The client then accesses the ftp site, downloads and extracts (e.g., unzips) the hotfix file, typically enters a required password, decrypts the file, and applies the hotfix solution. Clients seeking more widely available, yet not globally available (e.g., GDRs (Globally Distributed Releases)), hotfixes available to more than one client, also follow this process. Obviously, this process is laborious and only provides such a solution to the client who requested the solution.

In addition, a client often requires both limited distribution release software updates and global software update releases. Conventionally, obtaining these two types of software releases occurs in two entirely different ways and must be pursued separately. As noted previously, obtaining global software update releases is relatively straightforward and often occurs automatically. Conversely, obtaining limited distribution release software updates can be laborious. No single source for all types of software updates (e.g., both GDRs and hotfixes) is available. Moreover, conventionally clients cannot directly search or access a store of such private and public limited distribution release software updates. In particular, a client seeks such limited distribution release software updates from a technical account manager. Moreover, one or more of such limited distribution release software updates may relate to knowledge base entries. But no mechanism exists for linking such updates to knowledge base entries, whereby the distribution of such updates could be facilitated.

Unfortunately, conventional systems for distributing limited distribution release software changes stored using computer readable media are cumbersome and do not allow for direct client access to the private and public software changes available to them via other conventional mechanisms, such as global software updates and knowledge bases.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, aspects of the invention facilitate distribution of limited distribution release software changes stored using computer readable media by providing direct access of such changes by clients. This access provides appropriate limited distribution release software changes to clients stored using computer readable media, while ensuring that clients do not obtain software changes for which they do not have appropriate privileges. Aspects of the invention enhance distribution of both private and public limited distribution release software changes by providing both to clients simultaneously. Aspects of the invention provide links between a catalog of limited distribution release software changes and related knowledge base entries.

BRIEF DESCRIPTION OF THE DRAWINGS

Corresponding reference characters indicate corresponding parts throughout the drawings.

DETAILED DESCRIPTION

System

Figure 1:
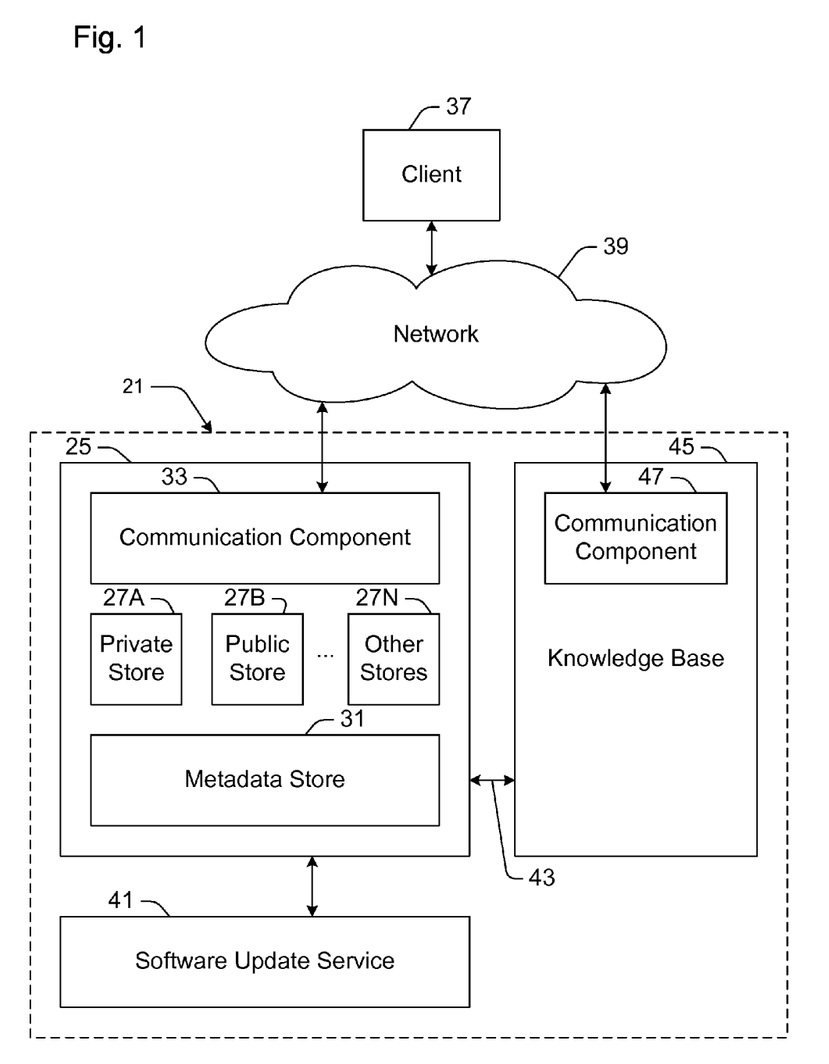
FIG. 1 depicts a catalog and system for limited distribution release software changes of one embodiment of the invention.

Referring now to the drawings, a system for storing, or cataloging, limited distribution release software changes according to one embodiment of the present invention is generally indicated 21 in FIG. 1. In this exemplary embodiment, the system 21 comprises a catalog 25 for maintaining a store 27 of limited distribution release software changes in a single location. As used herein, limited distribution release software changes include those software changes distributed to limited numbers of clients based upon their specific, rather than general, needs. Hotfixes generated for a specific client to address a specific issue, for example, are within this category, among others. Although such hotfixes are generated for single client and are not generally applicable to all clients, a few clients similarly situated may benefit from such hotfixes if they knew such hotfixes were available.

The catalog 25 comprises a store of private limited distribution release software changes 27A and a store of public limited distribution release software changes 27B. Private limited distribution release software changes are those requiring particular privileges for access (e.g., private hotfixes), while public limited distribution release software changes require no special privileges for access (e.g., public hotfixes). As would be readily understood by one skilled in the art, the catalog 25 may include any number of additional, either private, public, or other, stores 27N of limited distribution release software changes. In one exemplary embodiment, the limited distribution release software changes are stored in numerical form, such as in binary form. The limited distribution release software changes may be stored in any number of different form within the catalog 25 without departing from the scope of the embodiments of the present invention.

The catalog 25 also includes a store of metadata 31 related to the private limited distribution release software changes and the public limited distribution release software changes. For example, such metadata can include detailed information relating to the problems addressed by and enhancements included in the software changes.

A communication component 33 of catalog 25 comprises provides direct access to the stores 27 by a client 37 seeking limited distribution release software changes. The communication component 33 is adapted for receiving queries from the client 37, as will be discussed in greater detail below. In one exemplary embodiment, the communication component 33 includes a user interface (not shown) for receiving data from the client. The user interface can include data entry elements for entering information, including search terms and authentication information. The client 37 and communication component 33 communicate with one another via a network 39, such as the World Wide Web, as would be readily understood by one skilled in the art. Other communication means are also contemplated as within the scope of embodiments of the present invention.

The catalog 25 is further adapted to be readily imported into other application software. In one exemplary embodiment, the catalog 25 is adapted to be readily imported into a system administration software. As would be readily understood by one skilled in the art, the format of the data in the catalog 25 may be formatted, or coded, in any number of configurations to ensure that various applications can readily import the catalog. This provides greater functionality, as the catalog can be readily utilized in existing software applications, such as distribution software and searching software.

The catalog 25 is further adapted to be integrated with a software update service 41. In one exemplary embodiment, the catalog 25 is adapted to be integrated with a software update service 41 distributing globally distributed releases (e.g., Windows Server Update Service). In this embodiment, the catalog 25 can be adapted to be searched for each of the private limited distribution release software changes in the private store 27A, the public limited distribution release software changes in the public store 27B, and the globally distributed releases of the software update service 41, simultaneously. The catalog 25 can also be adapted to provide results of such a search simultaneously to the client 37.

The system 21 further links, generally indicated at 43, a knowledge base 45 with the stores 27 of limited distribution release software changes stored using computer readable media. In one embodiment, the knowledge base 45 includes a store of informational entries of interest to clients and a communication component 47 for providing direct access by the client 37 to the store of informational entries. The client 37 and communication component 47 communicate with one another via the network 39, such as the World Wide Web, as would be readily understood by one skilled in the art. At least a portion of the entries in the knowledge base 45 relate to one or more of the limited distribution release software changes of the catalog 25. The links 43 between the knowledge base 45 and the catalog 25 are adapted to provide connections between the informational entries and any related limited distribution release software changes. For example, the knowledge base 45 is adapted to provide access to the informational entries in response to inquiries such as by browsing or searching the knowledge base by the client 37. When displaying such knowledge base entries to the user via a user interface (not shown), the knowledge base 45 further displays selection elements with each of the informational entries in the portion displayed, thereby linking the informational entries of the knowledge base with any related limited distribution release software changes of the catalog 25. In this manner, the client 37 can find useful informational entries in the knowledge base and readily select one or more of the selection elements associated with entries to gain access to related limited distribution release software changes.

Network Service

Figure 2:
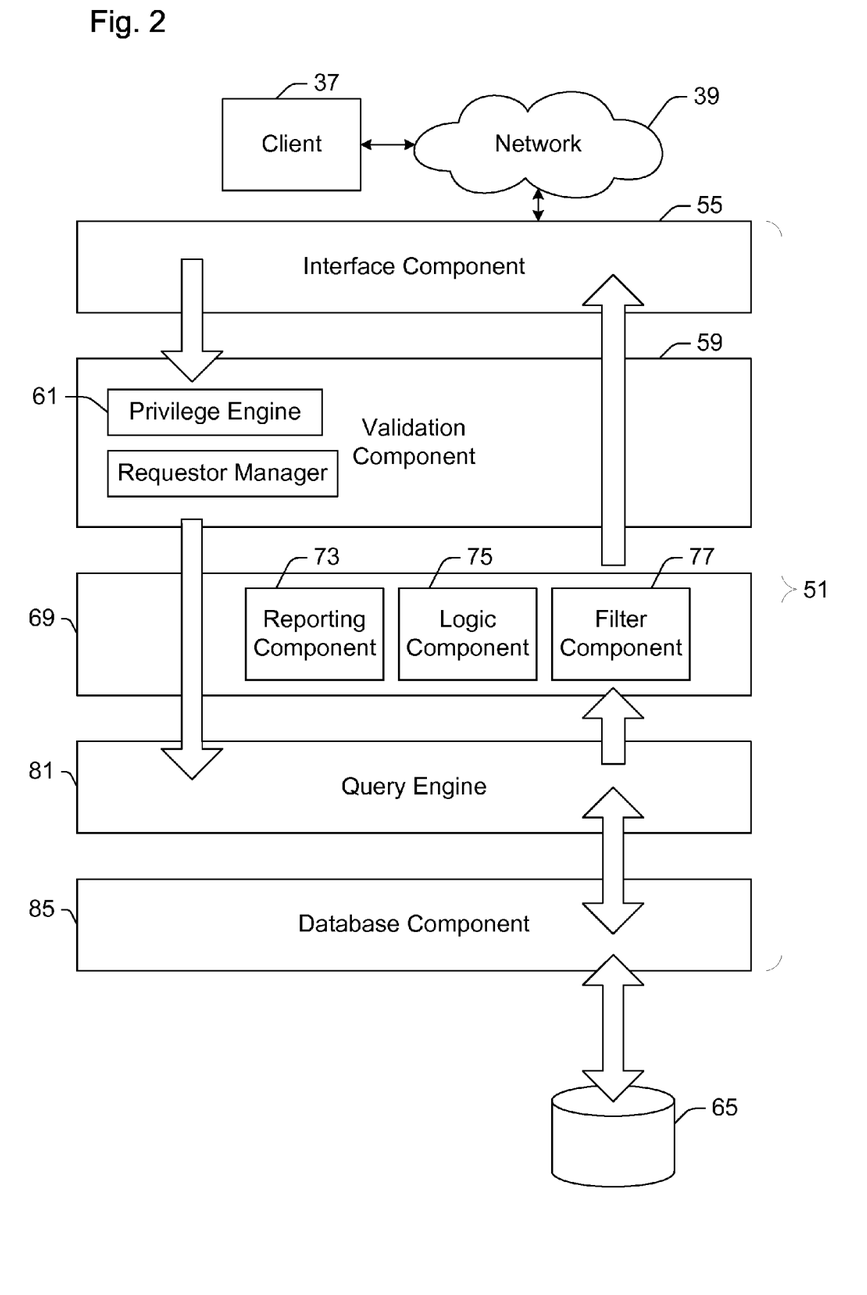
FIG. 2 depicts a network service for distributing limited distribution release software changes of another embodiment of the invention.

Referring now to FIG. 2, a network service 51 for distributing limited distribution release software changes to the client 37 is generally indicated 51. In one exemplary embodiment, the network service 51 may be utilized with the catalog 25 of the system 21 described above. In such an example, the network service 51 is accessible by the client 37 via network 39, and overlays the catalog 25 described above. The network service 51 comprises an interface component 55 for interfacing with the client 37 outside the network service 51 and receiving one or more search requests from the client for limited distribution release software changes. In one exemplary embodiment, the interface component 55 presents a user interface for accessing the network service 51 by the client 37 via the network 39.

The network service 51 further comprises a validation component 59 for authenticating the client 37 attempting to access the network service 51 via the interface component 55. With respect to authentication, those skilled in the art are familiar with several means for authenticating a user. In one exemplary embodiment, the validation component 59 receives a user name and password entered via the interface component 55 and compares the submitted information to a database of privilege information. For example, the user name and password credentials may be passed to the validation component 59 of the network service 51 by an component outside the network service (e.g., Windows Live ID). In another exemplary embodiment, the validation component 59 further comprises a privilege engine 61 for determining what portions of a database 65 the client 37 has privileges to access. In still another exemplary embodiment, the validation component 59 comprises a mapping engine, also depicted 61, for mapping client privileges and limited distribution release software changes to one another. In one example, the mapping engine 61 is responsive to changes in client privileges for changing the mapping.

The network service 51 also includes a management component 69 for managing the network service. In particular, the management component 69 comprises at least one of a reporting component 73 for managing communications between the client 37 and the network service 51, a logic component 75 for processing the functions of the network service, and a filter component 77 for filtering results of any query based upon the received search, as discussed below. The filter component 77 filters results of the query before providing results to the client 37. This ensures that the provided results conform to the wishes of the client 37 and do not include information or other data to which the client 37 should not have access. In one example, the filter component 77 filters results of the query based upon at least one of the private/public nature of the requested content, the requesting client's access rights, and the subject matter of the query results. For example, the filter component 77 could remove unnecessary metadata where a more streamlined web feed (e.g., an RSS feed) is requested.

The network service 51 further includes a query engine 81 for forming queries based upon received search requests from clients. For example, the received search requests may be reformatted to provide more accurate search results. Moreover, the query engine 81 may form a query with additional search criteria for broadening or narrowing the search, to better effectuate the search request of the client.

The network service 51 also comprises a database component 85 for receiving the queries formed by the query engine 81 and applying such queries to the database 65 of information related to limited distribution release software changes accessed by the network service. This application will be discussed in greater detail below with respect to the embodied methods of the present invention.

Methods for Distributing Limited Distribution Release Software Changes

Figure 3:
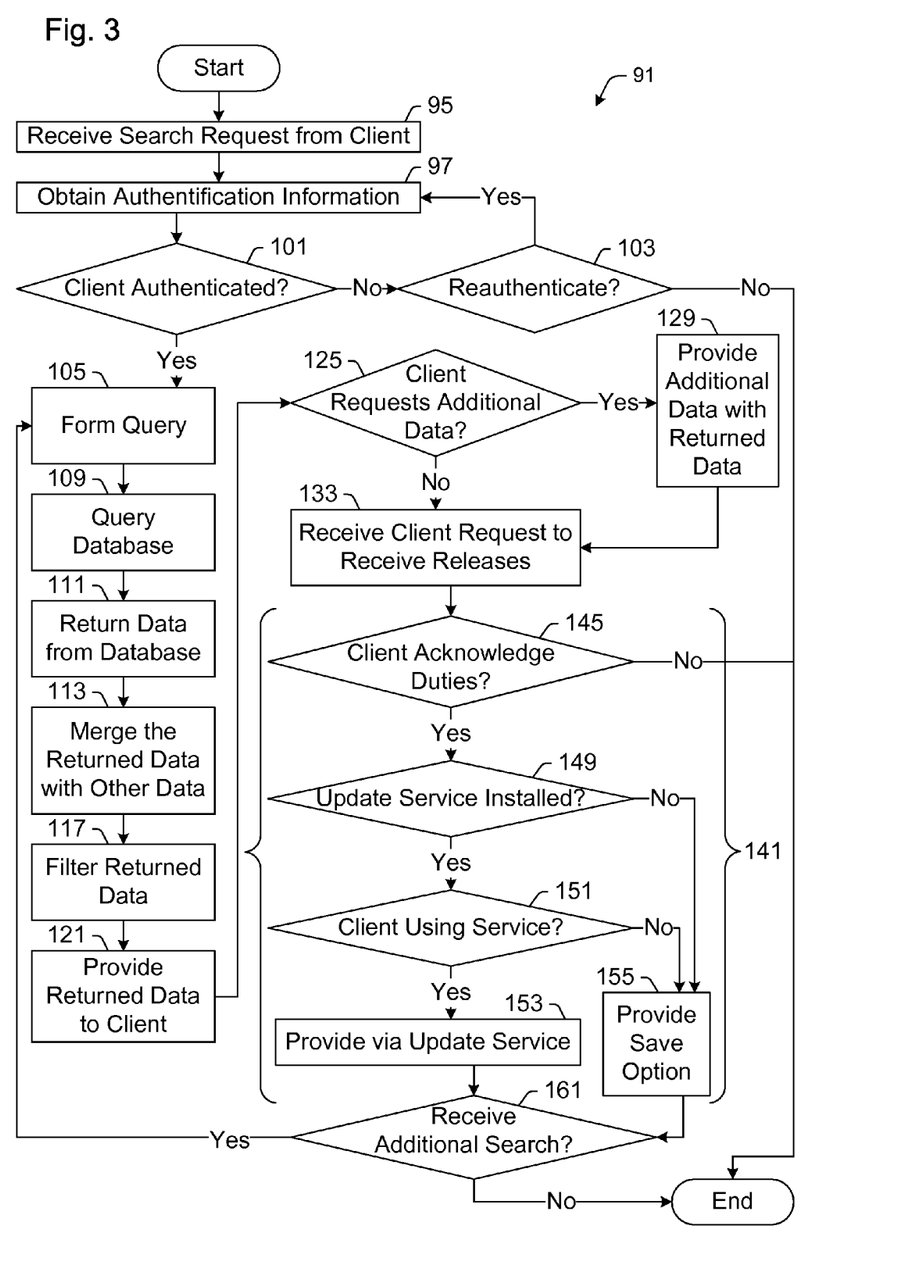
FIG. 3 is a flow diagram of a method of one embodiment of the invention.

A method for distributing limited distribution release software changes to clients 37 via a network 39 is generally indicated 91 in FIG. 3. The method 91 comprises receiving, at 95, a search request from the client 37 for limited distribution release software changes. These limited distribution release software changes can be any number of objects, including hotfixes, for example, as discussed above.

The method 91 also comprises obtaining, at 97, authentication information about the client 37 submitting the search request. In one example, obtaining 97 authentication information comprises obtaining an identifier and a password (e.g., via a Windows Live ID). This information may be obtained 97 in any number of ways, including receiving authentication information from the client 37 and obtaining authentication information from a client cookie, among others.

The method 91 continues by authenticating, at 101, the client 37 with the obtained 97 authentication information. For example, with the obtained 97 identifier and password. Where the authentication 101 fails, a client may attempt to reauthenticate, at 103.

The method 91 further comprises forming, at 105, a query in accordance with the received search request. For example, the received search request may be reformatted to provide more accurate search results. Moreover, the query may be formed with additional search criteria for broadening or narrowing the search, to better effectuate the search request of the client. The method 91 further queries, at 109, a database of limited distribution release software changes with the query.

After querying, the method 91 returns, at 111, data from the database associated with the limited distribution release software changes based upon the query. In one embodiment, the method 91 can further merge, at 113, the returned data from the database with other data associated with the data returned 111 from the database query. In the example shown, this merger 113 occurs before the filtering and providing processes discussed below. In still another example, returned 111 data from the database is merged 113 with metadata associated with the returned data.

The method 91 further filters, at 117, the returned data according to a screening criteria. In one exemplary embodiment, the filtering 117 the returned data comprises removing data not suitable for the client 37. For example, removing data not suitable for the client can comprise removing data the client 37 is not authorized to receive. In another example, removing data the client 37 is not authorized to receive comprises removing data associated with private limited distribution release software changes if the search request requests only data associated with public limited distribution release software changes.

The method 91 continues by providing, at 121, the returned data to the client. In one embodiment, the method 91 may then receive, at 125, a request from the client 37 to provide additional data relating to the returned data. Once the method 91 receives 125 such a request, the method provides, at 129, such additional data along with at least a portion of the returned 111 data. In one example, this additional data is detailed data about a specific limited distribution release software change, while continuing to provide a portion of the returned 111 data.

The method 91 further comprises receiving, at 133, a request from the client 37 to receive limited distribution release software changes associated with the provided 121 data. The method 91 then provides, generally indicated 141, the requested 133 limited distribution releases to the client 37. In one example, providing 121 the returned data to the client 37 comprises providing a selection element associated with each data associated with a limited distribution release software change included in the provided returned data. The selection elements allow the client 37 to request receipt of the associated limited distribution release software change.

In one alternative embodiment, the method 91 requires that the client 37 acknowledge, at 145, any contractual duties related to the requested limited distribution releases before providing 141 the requested limited distribution releases to the client. This acknowledgement 145 serves as a reminder to the client 37 that certain duties, such as confidentiality and licensing, may apply to the present release.

In one exemplary embodiment, providing 141 the requested limited distribution releases to the client includes detecting, at 149, if the recipient of the requested limited distribution releases has update service software (e.g., Windows Server Update Services) installed. Where the update service software is detected, the method 91 provides, at 151, the recipient with the option to use the installed update service software. If the client 37 elects to use the update service, which in one embodiment is assumed if installed, the method 91 provides, at 153, the requested limited distribution releases via the installed update service. Where the update service is not detected, the method 91 provides, at 155, the recipient, or client, with the option to save the requested limited distribution releases to a file system.

In another exemplary embodiment, the providing 141 the requested limited distribution releases to the client may further comprise providing, also at 141, software updates, globally distributed releases, service packs, and drivers, among others, related to the client with the provided limited distribution releases. In this manner, the method 91 can provide helpful content to the client while providing the requested limited distribution releases.

In another exemplary embodiment, the method 91 comprises receiving, at 161, at least one additional search request from the client 37 after providing 141 the returned data to the client. The method 91 continues with the other processes of the method and ultimately provides further data to the client after providing the returned data to the client.

Figure 4:
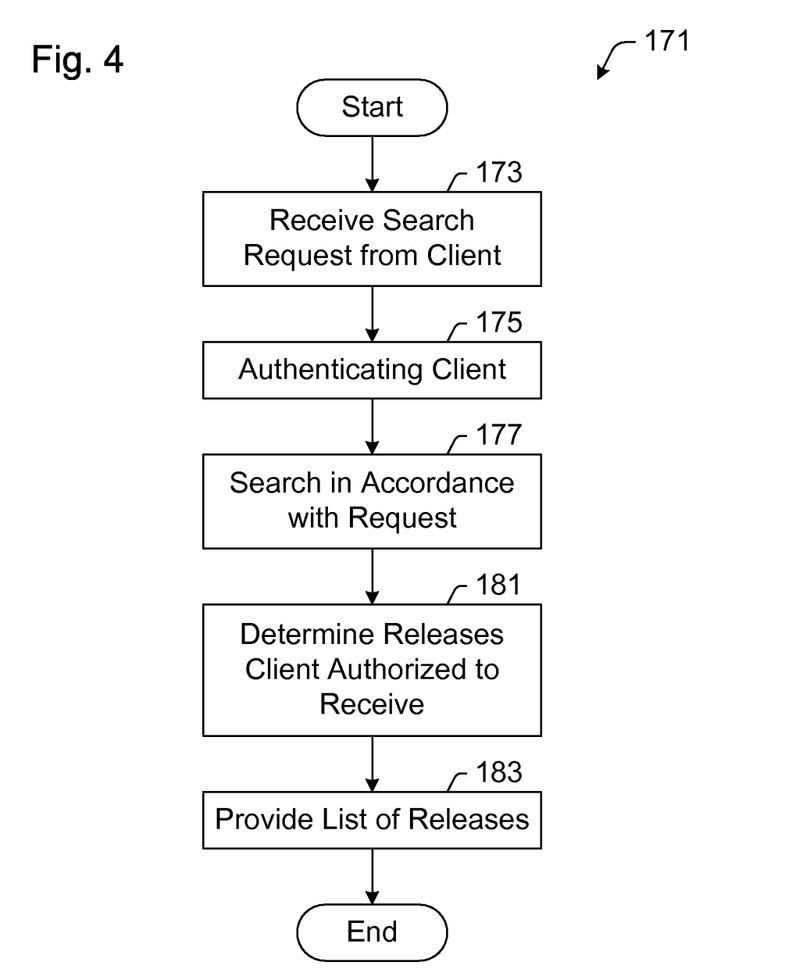
FIG. 4 is another flow diagram of a method of another embodiment of the invention.

Referring now to FIG. 4, another method for distributing limited distribution release software changes to a client 37 via a network 39 is generally indicated at 171. The method 171 comprises receiving, at 173, a search request from a client 37 seeking limited distribution release software changes. The method 171 further comprises authenticating, at 175, the client with authentication information, generally as set forth above with the previous method.

The method 171 searches, at 177, in accordance with the search request, and the search yields both private limited distribution release software changes and public limited distribution release software changes. The method 171 further determines, at 181, the types of limited distribution release software changes the client 37 is authorized to receive (e.g., public and/or private).

The method 171 provides, at 183, a list of limited distribution release software changes derived from the search request. The list includes all public limited distribution release software changes derived from the search request. The list also includes any private limited distribution release software changes derived from the search request that the client is authorized to receive.

Method for Providing a Limited Distribution Release Software Change

Figure 5:
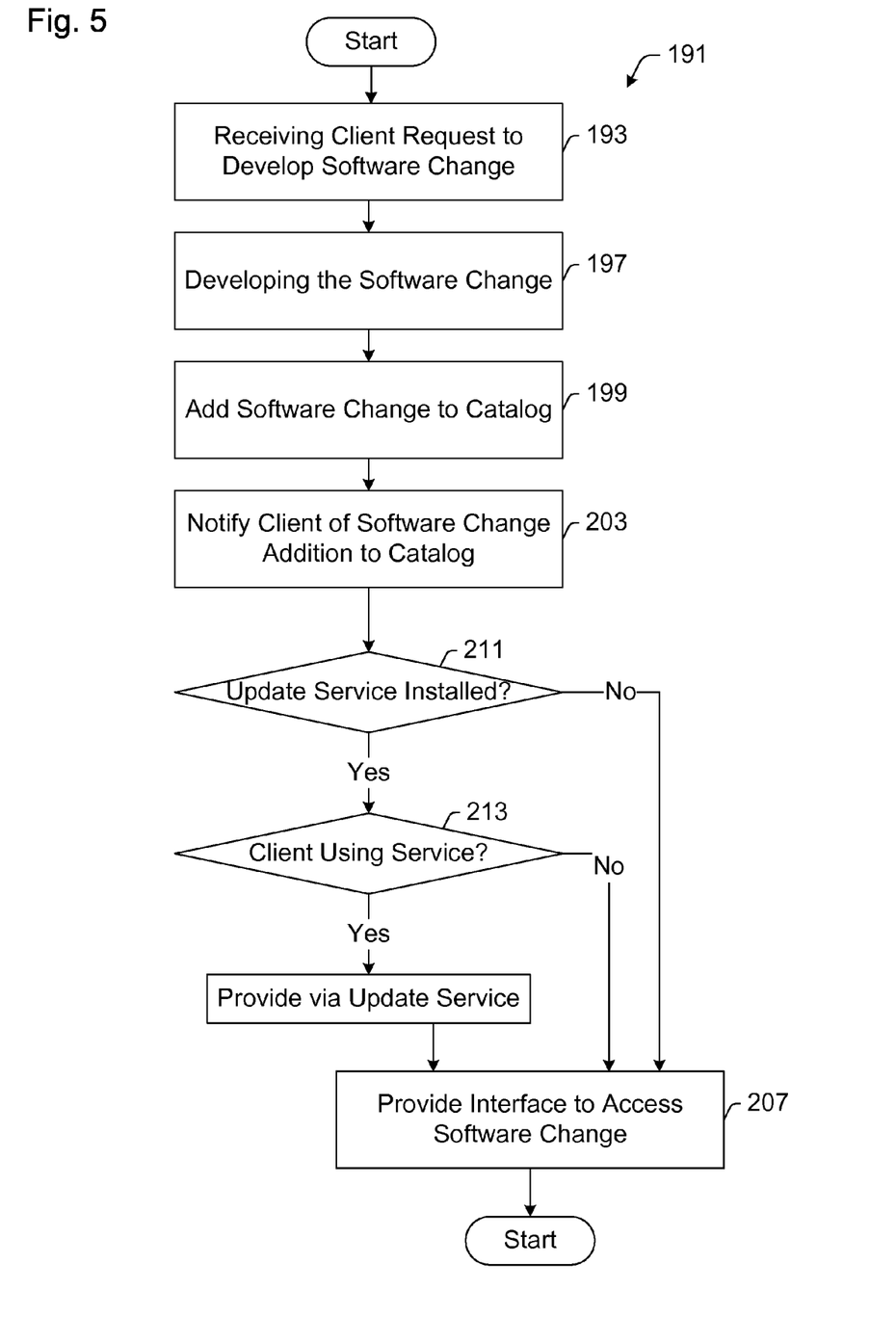
FIG. 5 is yet another flow diagram of a method of still another embodiment of the invention.

A method for providing a limited distribution release software change is generally indicated 191 in FIG. 5. The method 191 comprises receiving, at 193, a request from a client 37 to develop a limited distribution release software change. The method 191 further develops, at 197, the limited distribution release software change in response to the request from the client 37. This request and development process is typically administered manually by a technical account manager and product development personnel.

The method 191 adds, at 199, the developed limited distribution release software change to a catalog adapted for maintaining a store of limited distribution release software changes. In one exemplary embodiment, the adding 199 the developed limited distribution release software change to a catalog comprises adding the limited distribution release software change to a catalog adapted for maintaining both a store of limited distribution release software changes and a store of globally distributed releases. The method 191 notifies, at 203, the client 37 that the limited distribution release software change has been added 199 to the catalog.

The method 191 further provides, at 207, the client 37 with an interface for accessing the catalog to gain access to the developed limited distribution release software change. In the example noted above where the catalog is adapted for maintaining both a store of limited distribution release software changes and a store of globally distributed releases, providing 207 the client with an interface further comprises providing the client with an interface for accessing both the store of limited distribution release software changes and the store of globally distributed releases.

In another exemplary embodiment, the method 191 further comprises detecting, at 211, if the client has an update service software installed. Where an update service software is detected 211, the method 191 provides, at 213, the recipient with the option to use the installed update service software to access the developed limited distribution release software change, generally as set forth above with the method 91 of FIG. 3.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A method for providing limited distribution release software changes, said method comprising:

mapping a first set of client privileges to the limited distribution release software changes in a catalog configured for maintaining both a store of limited distribution release software changes, and a store of globally distributed releases;

receiving a request from a client to develop at least one new limited distribution release software change;

developing the new limited distribution release software change;

adding the newly developed limited distribution release software change to the catalog configured for maintaining the store of limited distribution release software changes;

updating the first set of client privileges to the catalog to yield a second set of client privileges;

notifying the client that the newly developed limited distribution release software change has been added to the catalog;

receiving the credentials from a client cookie, said client seeking the newly developed limited distribution release software change from the catalog;

authenticating the client using the credentials;

receiving acknowledgment from the client of confidentiality and licensing duties related to the newly developed limited distribution release software change from the client;

mapping the second set of client privileges to limited distribution release software changes in the catalog configured for maintaining both the store of limited distribution release software changes, and the store of globally distributed releases;

providing the client with an interface via a data communication network for accessing the catalog based on the mapped second set of client privileges to gain access to the newly developed limited distribution release software change;

querying the catalog for the newly developed limited distribution release software change in response to receiving a search request from the client via the interface, the client being able to access both the store of limited distribution release software changes and the store of globally distributed releases;

providing the query result identifying the newly developed limited distribution release software change to the client based on the mapped second set of privileges, wherein the query result is filtered according to a screening criteria, wherein said providing the query result further includes providing the client, along with the query result, additional software updates other than the newly developed limited distribution release software change, said additional software updates being related to the client;

detecting if the client has an update service installed, providing the client with the option to use the installed update service to access the newly developed limited distribution release software change where the update service is detected;

providing the client with the option to save the newly developed limited distribution release software change to a file system where the update service is not detected; and providing the newly developed limited distribution release software change via the installed service if the client elects to use the update service where the update service is detected.

2. The method of claim 1, said method further comprising storing the limited distribution release software changes in numerical form.

3. The method of claim 1, said method further comprising storing the limited distribution release software changes in binary form.

4. The method of claim 1 wherein said catalog is adapted to be readily imported into other application software.

5. The method of 4 wherein the other application software comprises a system administration software.

6. The method of 4 wherein the catalog is adapted to be integrated with the update service software.

7. The method of 4 further comprising providing a query result identifying globally distributed releases simultaneously with the newly developed limited distribution release software change.

8. The method of claim 1 wherein said filtering according to a screening criteria further comprises removing data not suitable for the client.

9. The method of claim 8 wherein data not suitable for the client comprises data the client is not authorized to receive.

10. The method of claim 9 wherein data not suitable for the client comprises data associated with limited distribution release software changes if the search request contains only data associated with globally distributed releases.

\* \* \* \* \*